United States Patent [19]

Dhyanchand et al.

[11] Patent Number: 5,027,265
[45] Date of Patent: Jun. 25, 1991

[54] REGULATOR FOR STEPPED-WAVEFORM INVERTER

[75] Inventors: P. John Dhyanchand; Sunil Patel; Chai-Nam Ng; Vietson Nguyen, all of Rockford, Ill.

[73] Assignee: Sundstrand Corporation, Rockford, Ill.

[21] Appl. No.: 453,975

[22] Filed: Dec. 20, 1989

[51] Int. Cl.⁵ .......................................... H02M 3/335
[52] U.S. Cl. ...................................... 363/37; 363/43; 363/71; 363/97; 322/28
[58] Field of Search ....................... 363/37, 41, 43, 64, 363/65, 71-72, 95, 97-98, 131, 132; 322/25, 28, 89, 90

[56] References Cited

U.S. PATENT DOCUMENTS

| | | |
|---|---|---|
| 3,374,414 | 3/1968 | Garnett ................................. 363/43 |
| 3,477,010 | 11/1969 | VeNard . |
| 3,775,662 | 11/1973 | Compoly et al. . |
| 4,063,143 | 12/1977 | Forstbauer ............................ 363/43 |
| 4,494,179 | 1/1985 | Inokuchi et al. . |
| 4,599,687 | 7/1986 | Smith . |
| 4,666,020 | 5/1987 | Watanabe .............................. 363/37 |
| 4,870,557 | 9/1989 | Stacey ................................... 363/43 |

OTHER PUBLICATIONS

Article entitled, "Which DC/AC Inverter?", appearing in *Electronic Design*, Dec. 6, 1974, by George A. O'Sullivan.

Primary Examiner—Peter S. Wong
Attorney, Agent, or Firm—Marshall, O'Toole, Gerstein, Murray & Bicknell

[57] ABSTRACT

A regulator for a stepped-waveform inverter having first and second subinverters which produce waveforms having a variable phase displacement therebetween and a summing transformer which sums the outputs of the subinverters includes circuitry for detecting a deviation of a parameter of the AC output power produced by the inverter from a reference and circuitry coupled to the detecting circuitry for deriving a phase command signal from the detected deviation. A comparator compares the phase command signal with a ramp signal to obtain a comparison signal and circuitry operates the first and second subinverters responsive to the comparison signal to cause the phase displacement to vary in accordance with the phase command signal.

16 Claims, 10 Drawing Sheets

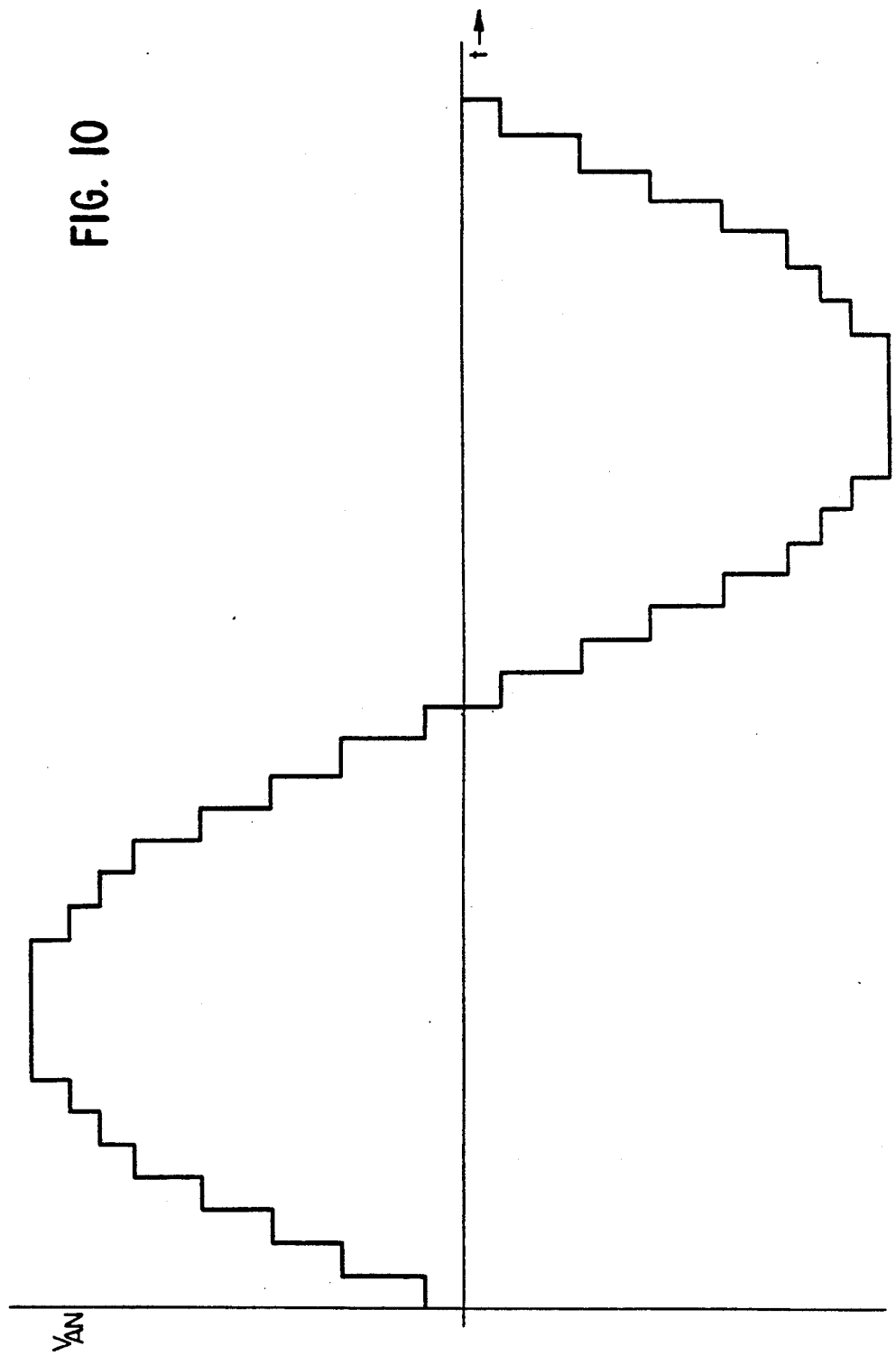

REGULATOR FOR STEPPED-WAVEFORM INVERTER

TECHNICAL FIELD

The present invention relates generally to DC/AC converters, and more particularly to a regulator for an inverter.

BACKGROUND ART

There is frequently a need to obtain DC power and constant-frequency AC power for DC and AC loads, respectively. For example, in aircraft and aerospace applications, variable-frequency AC power produced by a brushless, synchronous generator driven by an aircraft jet engine is converted by a rectifier bridge and a DC link filter into DC power on first and second DC link conductors. A static inverter coupled to the DC link conductors converts the DC power into constant-frequency AC power which is filtered and applied to frequency-sensitive AC loads. DC power for DC loads may be obtained directly from the rectifier bridge. The rectifier bridge and inverter together comprise a power converter known as a variable-speed, constant-frequency (VSCF) system.

The inverter used in VSCF systems may either be of the pulse-width modulated (PWM) type or the stepped-waveform type. An example of the latter type of inverter is disclosed in Compoly, et al., U.S. Pat. No. 3,775,662. The inverter is of the 24-step type and includes first through fourth inverter bridges coupled to first through fourth sets of three-phase primary windings of a summing transformer. The first and third sets of primary windings are connected in a wye configuration whereas the second and fourth sets of primary windings are connected in a delta configuration. A secondary winding is associated with each primary winding of the summing transformer and each secondary winding is connected in series with other secondary windings of the same phase to form three sets of series-connected windings. A summed voltage is developed across each set of series-connected secondary windings. The first and third inverter bridges are operated to produce identical waveforms in the first and third sets of primary windings except that the waveform produced by the third inverter bridge is displaced 15° with respect to the waveform produced by the first inverter bridge. Likewise, the waveforms produced by the second and fourth inverter bridges are identical, except that the waveform of the latter lags the former by 15°. In the event of an overload condition at the inverter output, the phase relationship of the currents from the inverter bridges is changed, so that the AC power from the summing transformer is reduced to a safe level. When the overload condition subsequently disappears, the original phase relationship of the currents is restored so that normal operation can continue.

An article entitled "Which DC/AC Inverter?" appearing in *Electronic Design*, Dec. 6, 1974, by George A. O'Sullivan discloses a 24-step waveform inverter similar to that disclosed in Compoly, et al. having four square-wave generators coupled to a summing transformer. This article indicates that output voltage control is possible utilizing a phase shifter which shifts two of the waveforms produced by two of the square wave generators with respect to the waveforms produced by the remaining generators. A feedback network is coupled between an output of the inverter and the phase shifter and a six-stage Johnson counter is coupled between the phase shifter and the square wave generators that develop the shifted waveforms.

Inokuchi, et al., U.S. Pat. No. 4,494,179 discloses a power conversion system including first and second power converters, one of which operates as a rectifier and the other which operates as an inverter together with regulation circuitry for regulating DC power flowing between the converters and a control for operating the inverter.

SUMMARY OF THE INVENTION

In accordance with the present invention, a regulator for a stepped-waveform inverter having at least two subinverters varies the phase displacement between the outputs of the subinverters in dependence upon a parameter of the AC power produced by the inverter to thereby regulate such parameter.

More particularly, a regulator for a stepped-waveform inverter having first and second subinverters, a summing transformer having first and second primary windings coupled to the first and second subinverters, respectively, and a secondary winding in which summed AC output power is produced includes means for detecting a deviation of a parameter of the AC output power from a reference and means coupled to the detecting means for deriving a phase command signal from the detected deviation. A comparator compares the phase command signal with a ramp signal to obtain a comparison signal and first and second means responsive to the comparison signal are provided for operating the first and second subinverters, respectively, to cause the phase displacement between first and second waveforms produced by the subinverters to vary in accordance with the phase command signal. By varying the phase displacement in this manner, the output parameter may be maintained at a desired level.

Preferably, each of the first and second operating means includes a memory which stores data for developing the first and second waveforms, respectively. Each of the first and second operating means further includes a one-shot wherein the one-shot of the first operating means receives a synchronization signal and the one-shot of the second operating means receives the comparison signal. A counter is coupled between each one-shot and the memory of the respective operating means wherein the counters accumulate pulses of a clock signal to in turn develop sequential addresses for accessing the memory. Each one-shot is periodically reset by the signal coupled thereto.

Also in the preferred embodiment, the ramp signal is produced by an integrator which integrates the synchronization signal. The integrator comprises an operational amplifier having a pair of inputs and an output wherein one of the inputs receives the synchronization signal and the other input receives a reference signal. A transistor and a capacitor are coupled to the output of the operational amplifier and the capacitor is periodically charged by a constant current source and discharged by a transistor through a resistor to develop the ramp signal.

The regulator of the present invention regulates the output of a stepped-waveform inverter in a simple and effective manner.

BRIEF DESCRIPTION OF THE DRAWINGS

FIG. 10 is a waveform diagram illustrating a phase output-to-neutral voltage produced in the secondary windings of the summing transformer of FIG. 3B.

DESCRIPTION OF THE PREFERRED EMBODIMENT

Figure 1:
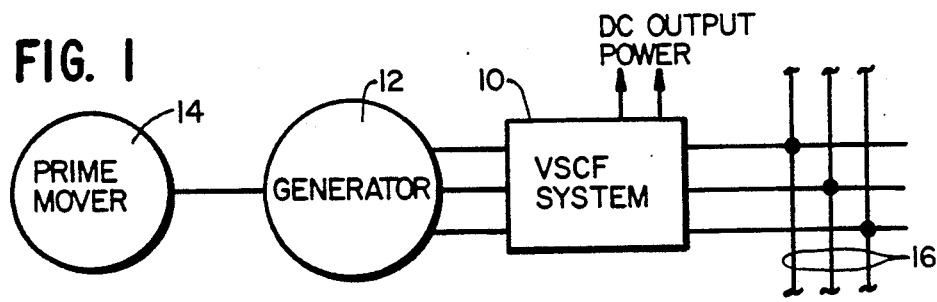
FIG. 1 comprises a block diagram of a generator and VSCF power conversion system for converting variable-speed motive power produced by a prime mover into DC output power and constant-frequency electrical AC power.

Referring now to FIG. 1, a variable-speed constant-frequency (VSCF) system 10 and a brushless, synchronous generator 12 together convert variable-speed motive power produced by a prime mover 14, such as an aircraft jet engine, into DC output power and constant-frequency electrical AC power on an AC load bus 16. It should be noted that contactors located between the VSCF system 10 and the AC load bus 16 are not shown for the sake of simplicity.

Figure 2:
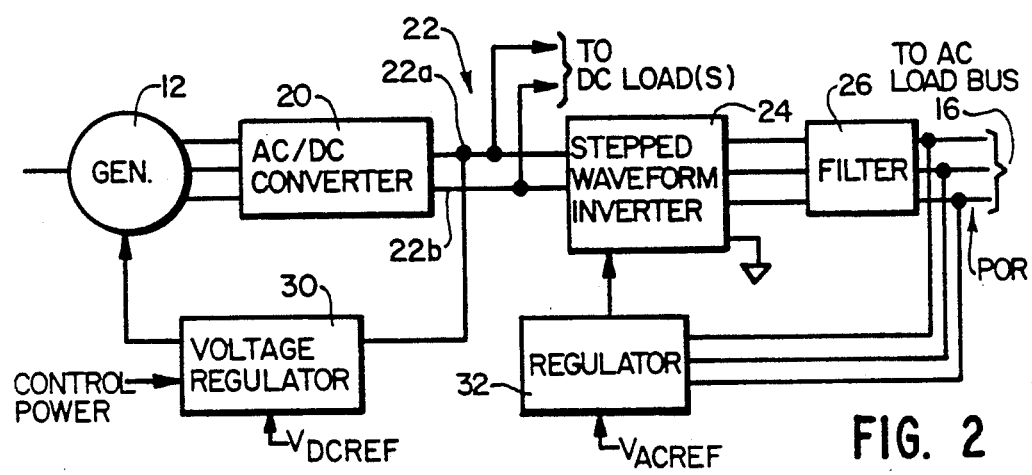
FIG. 2 is a block diagram of the VSCF system of FIG. 1.

As seen in FIG. 2, the VSCF system 10 includes an AC/DC converter 20 which converts the variable-frequency power produced by the generator 12 into the DC power. The DC power is developed on a DC link 22 comprising first and second DC link conductors 22a, 22b. The DC link conductors 22a, 22b are coupled to a stepped-waveform inverter 24 which converts the DC power on the DC link 22 into single or polyphase constant-frequency AC power which may be filtered by an optional filter 26 and provided to the load bus 16.

DC power for one or more DC loads may be obtained directly from the DC link conductors 22a, 22b. This voltage is regulated by a voltage regulator 30 which is connected between the DC link conductor 22a and the generator 12. The voltage regulator 30, as noted in greater detail hereinafter, compares the voltage on the DC link conductor 22a against a DC reference $V_{DCREF}$ and modulates the flow of control power to an exciter of the generator 12 to regulate the voltage on the DC link 22.

The deviation of a parameter of the power produced by the stepped-waveform inverter 24 downstream of the filter 26 at a point of regulation (POR) from a reference level $V_{ACREF}$ is detected by a regulator 32 and this deviation is utilized to operate the stepped-waveform inverter 24 to maintain the output parameter substantially at a regulated AC value.

Figure 3:
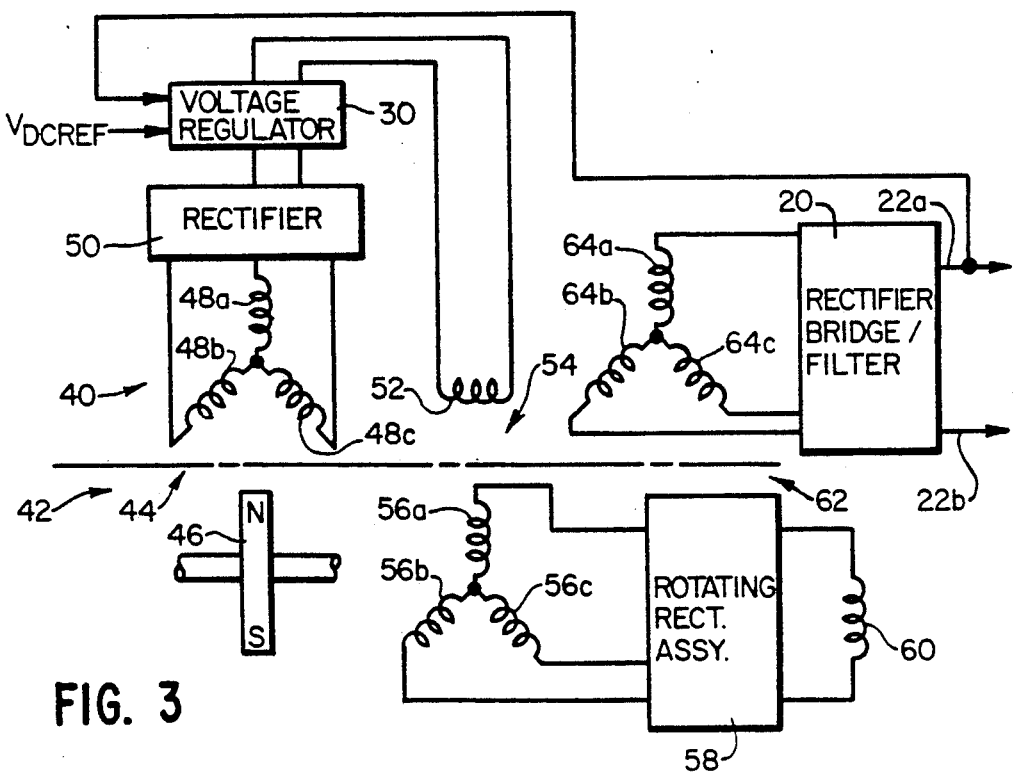
FIG. 3 comprises a combined schematic and block diagram of the generator and AC/DC converter of FIG. 2.

Referring now to FIG. 3, the generator 12 includes a stator 40 within which stator components are disposed and a rotor 42 on which rotor components are disposed. The generator 12 comprises a permanent magnet generator (PMG) 44 including a permanent magnet rotor assembly 46 and a set of armature windings 48 in which the control power is developed. The armature windings 48 are coupled through a rectifier assembly 50 and the voltage regulator 30 to a field winding 52 of an exciter 54. Rotation of the rotor 42 as field current is flowing in the field winding 52 induces a three-phase voltage in three-phase armature windings 56a-56c of the exciter 54. The AC power induced in the windings 56a-56c is converted into DC power by a rotating rectifier assembly 58 and is supplied to a field winding 60 of a main generator portion 62. Rotation of the rotor 42 while current is flowing in the field winding 60 causes three-phase voltages to be induced in armature windings 64a-64c of the main generator portion 62. The armature windings 64a-64c are coupled to the AC/DC converter 20 which, in the preferred embodiment, comprises a rectifier bridge/filter of conventional design.

Figure 4A:
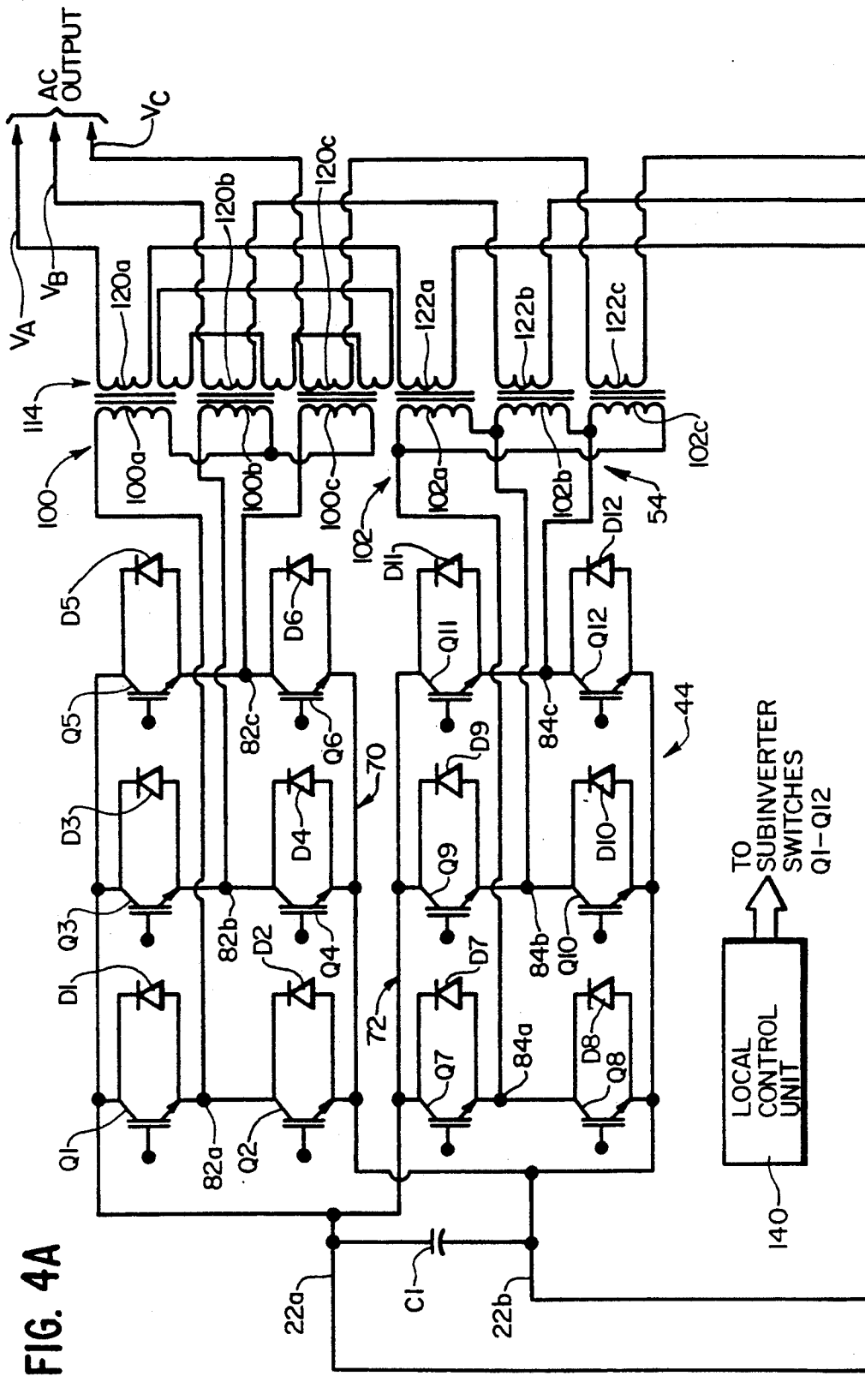
FIGS. 4A, 4B and 4C, when joined along the dashed lines with FIG. 4A at the top, FIG. 4B in the middle and FIG. 4C at the bottom, together comprise a combined schematic and block diagram of the stepped-waveform inverter of FIG. 2.
Figure 4B:
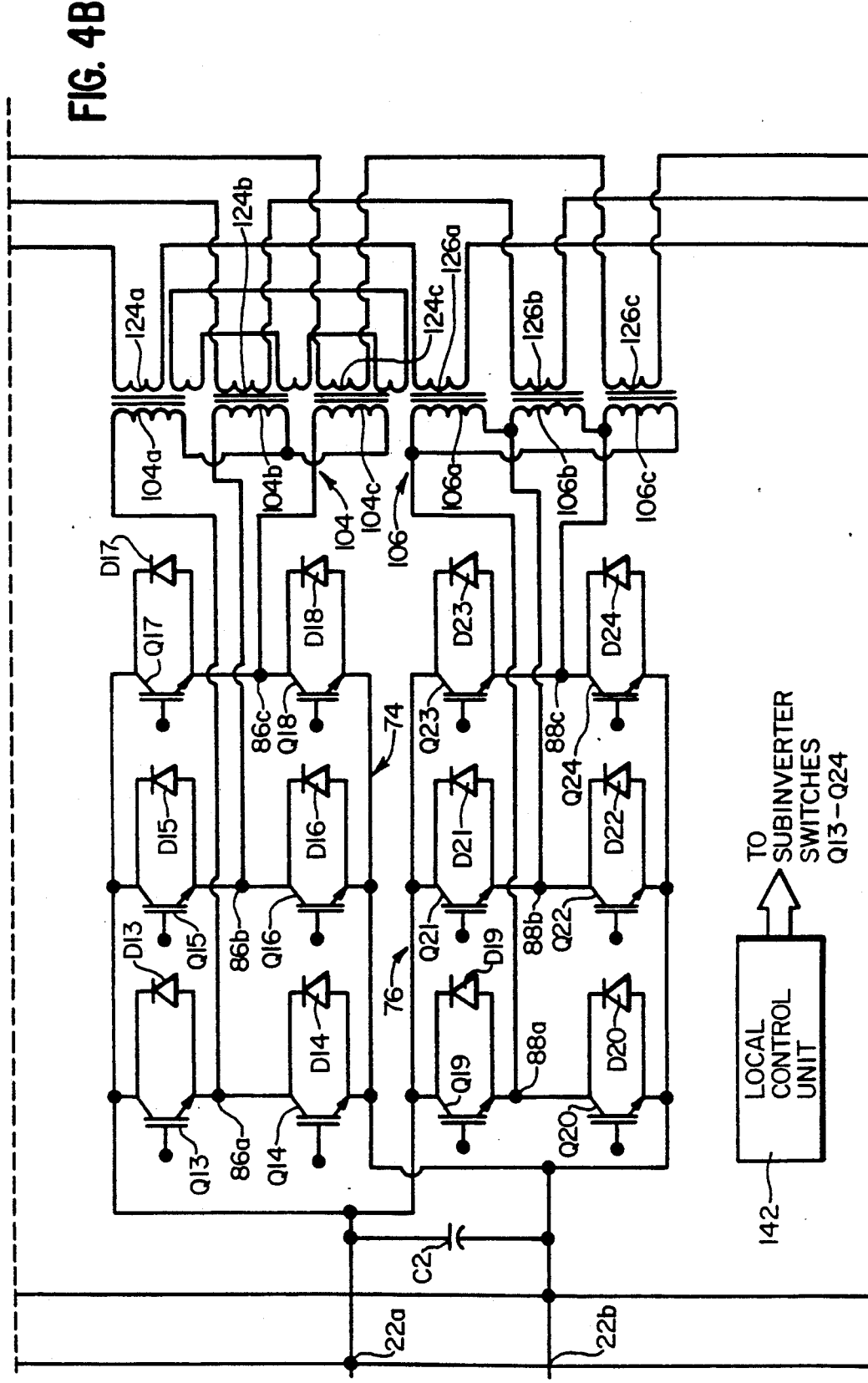
Figure 4C:
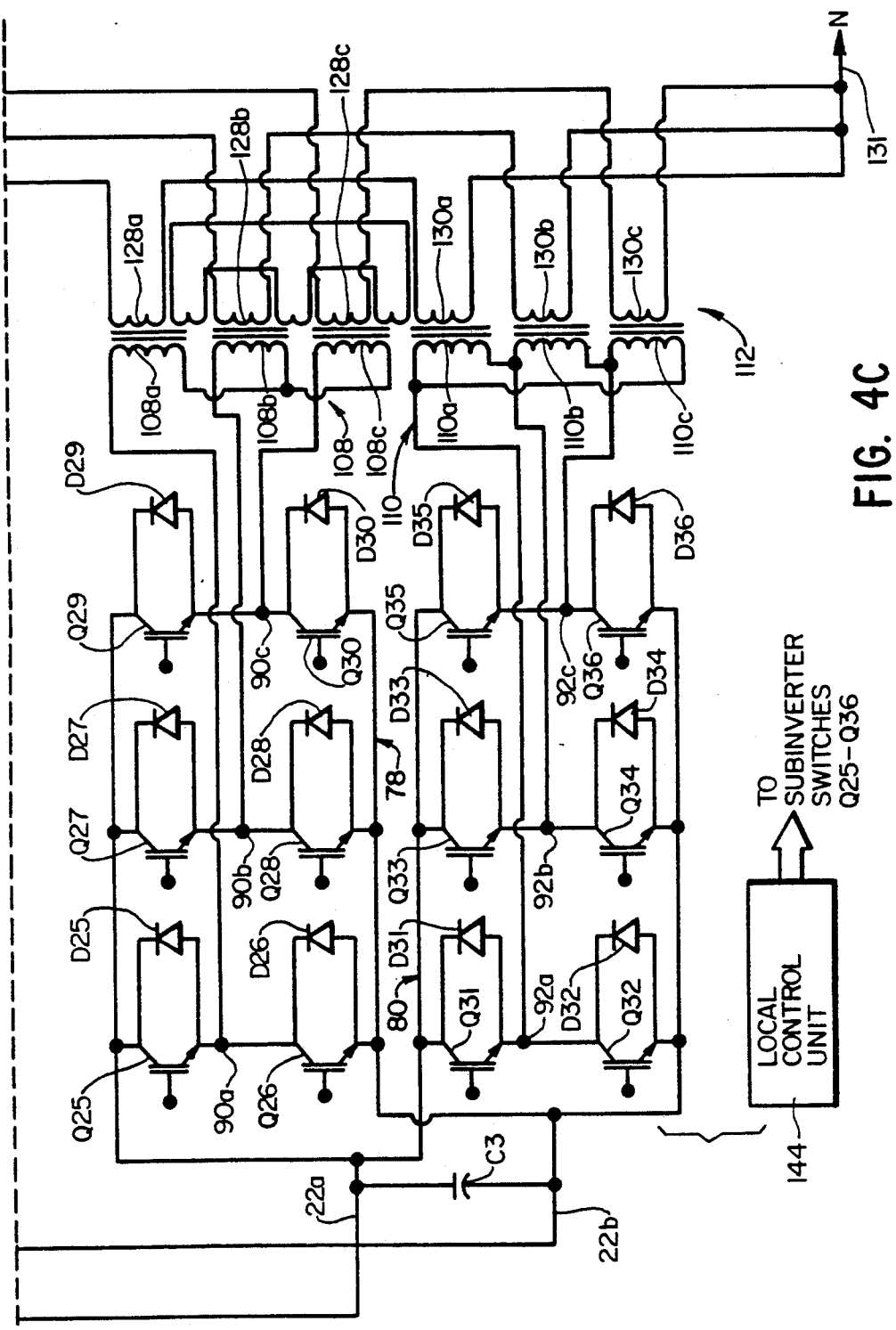

Referring now to FIGS. 4A-4C, the converter 20 is coupled by the DC link conductors 22a, 22b and capacitors C1, C2 and C3 to first through sixth subinverters 70, 72, 74, 76, 78 and 80 which are shown in simplified form. The subinverters 70, 72, 74, 76, 78 and 80 include power switches Q1-Q6, Q7-Q12, Q13-Q18, Q19-Q24, Q25-Q30 and Q31-Q36, respectively, which are connected together in a bridge configuration. The power switches Q1-Q36 are preferably transistors, although they may be different devices, such as thyristors. In the former case, the transistors Q1-Q36 may be of the conventional bipolar type or may be of the insulated gate bipolar type (IGBT) or any other type having suitable current and voltage handling capabilities. Flyback diodes D1-D36 are coupled across the power switches Q1-Q36, respectively.

Phase outputs 82a-82c, 84a-84c, 86a-86a, 88a-88c, 90a-90c and 92a-92c are coupled to first through sixth sets of primary windings 100, 102, 104, 106, 108 and 110 of a summing transformer 112. The summing transformer 112 further includes a set of three-phase secondary windings 114 which are connected in a wye configuration and across which a three-phase, summed voltage is produced. More specifically, the first, third and fifth sets of primary windings 100, 104, 108 include windings 100a-100c, 104a-104c and 108a-108c which are connected together in star or wye configuration. The remaining sets of primary windings 102, 106 and 110 include windings 102a-102c, 106a-106c and 110a-110c which are connected together in a delta configuration. Associated with each primary winding 100a-110c is a secondary winding 120a-130c, respectively. The windings 120a, 122a, 124a, 126a, 128a and 130a are connected in series as are the windings 120b-130b and the windings 120c-130c. The free ends of the windings 130a, 130b and 130c are connected together to form a neutral terminal 131 while the AC output is produced at the free ends of the windings 120a, 120b and 120c.

Figure 5:
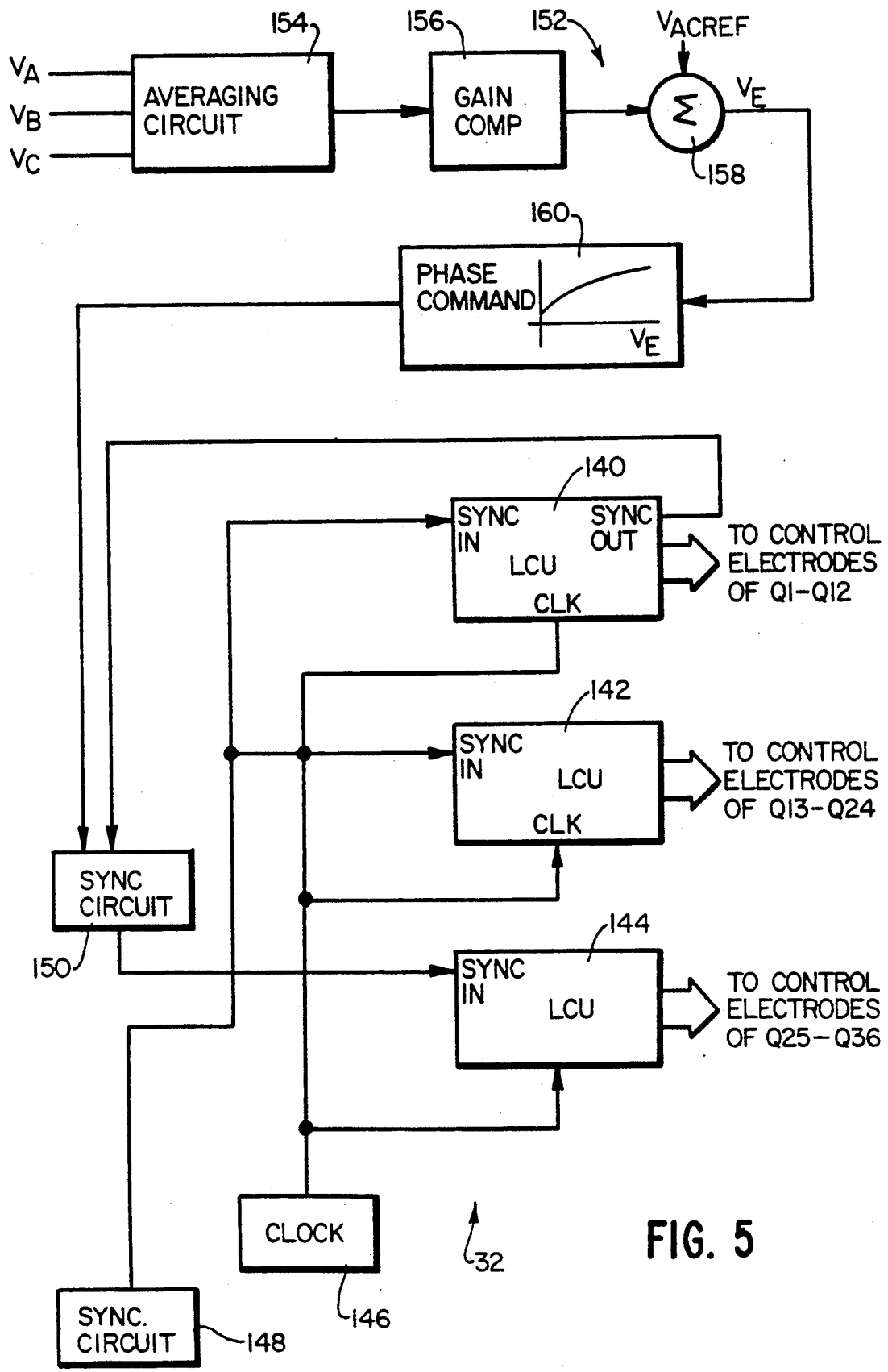
FIG. 5 is a block diagram of the voltage regulator of FIG. 3 together with a block diagram illustrating the interconnection of the local control units of FIGS. 4A-4C.

The power switches Q1-Q12 of the subinverters 70, 72 are operated by a local control unit (LCU) 140. Likewise, the switches Q13-Q24 of the subinverters 74, 76 are operated by an LCU 142 while the switches Q25-Q36 of the subinverters 78, 80 are operated by an LCU 144. As seen in FIG. 5, the LCU's 140-144 receive a clock signal developed by a clock 146. In addition, the LCU's 140, 142 receive a synchronization signal developed by a first synchronization circuit 148 while the LCU 144 receives a synchronization signal developed by second synchronization circuit 150. The synchronization circuit 148 and/or the clock 146 may be a part of a master control unit or may be separate circuits, as desired. The synchronization circuit 148 develops a waveform which controls the output phase and frequency of the waveforms produced by the subinverters 70-76, as noted in greater detail hereinafter.

The synchronization circuit 150 is responsive to a synchronization output produced by the LCU 140 as well as a phase command signal produced by a phase command circuit 152. The circuit 152 includes an averaging circuit 154 which develops an average signal representing the average level of the phase voltages $V_A$, $V_B$ and $V_C$ developed by the set of secondary windings 114. The average signal is processed by a gain and compensation circuit 156 and provided to a first, inverting input of a summer 158. The summer 158 includes a non-inverting input which receives the reference signal $V_{ACREF}$ and develops an error signal $V_E$ representing the deviation of the output voltage of the inverter 24 from a reference. This signal is provided to a function generator 160 which develops the phase command signal. The function generator 160 compensates for the nonlinear relationship between the output voltage of the inverter 24 and the phase displacement between the outputs of two of the subinverters 70-80. The function generator 160 may also, if desired, establish limits for the phase command signal.

Figure 9:
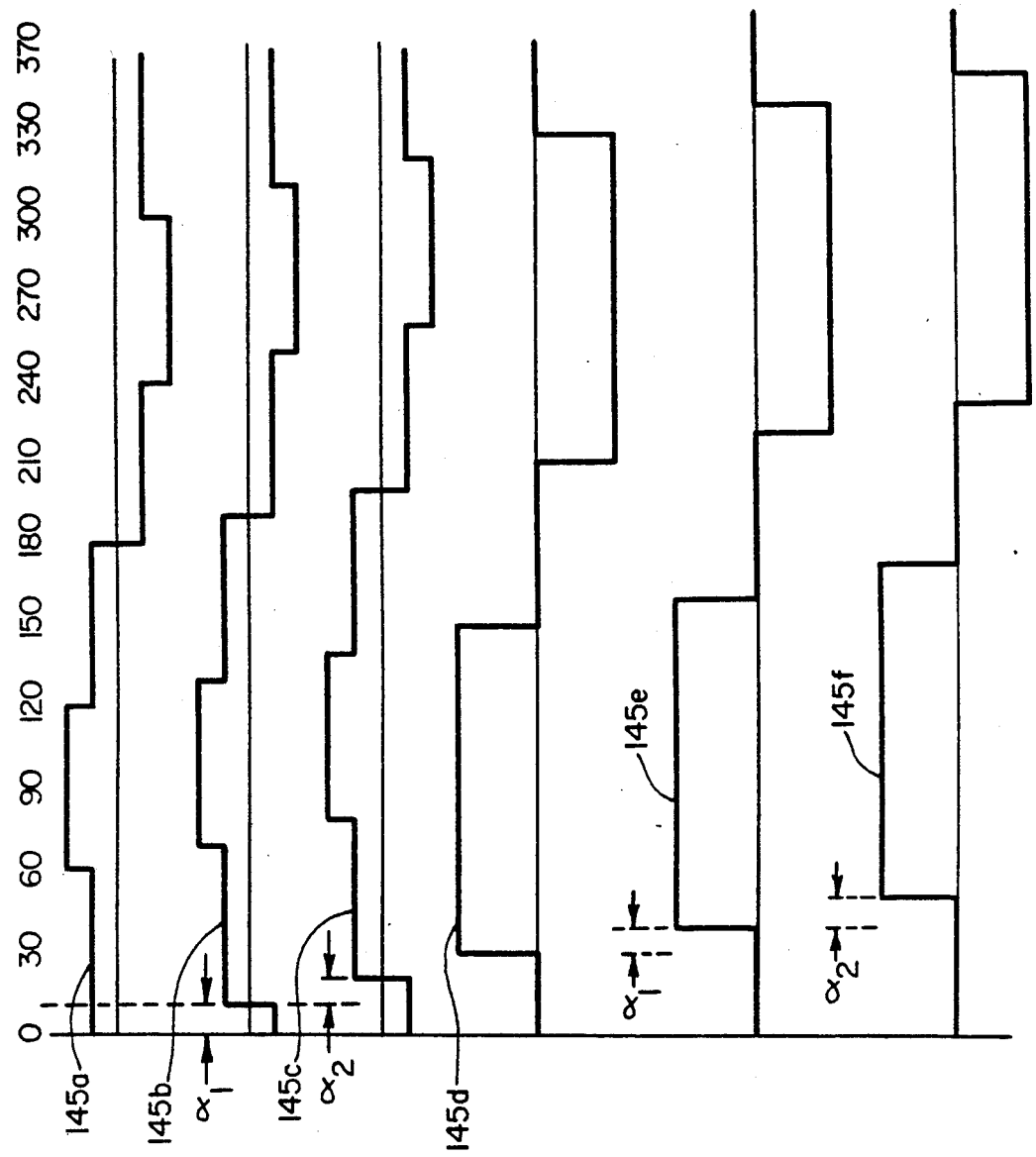
FIG. 9 comprises a series of waveform diagrams illustrating one phase of waveforms produced by the subinverters of FIGS. 4A-4C.

The first and second subinverters are operated by the LCU 140 to produce the rectangular waveforms 145a and 145d of FIG. 9. The subinverters 74 and 76 are operated by the local control unit 142 to produce rectangular waveforms 145b, 145e while the subinverters 78 and 80 are operated by the local control unit 144 to produce rectangular waveforms 145c and 145f. As seen in FIG. 9, the waveforms 145a-145c are identical as are the waveforms 145d-145f, except for differences in phase displacement. More particularly, the waveform 145b lags the waveform 145a by a phase displacement $\alpha_1$ while the waveform 145c lags the waveform 145b by a phase displacement $\alpha_2$. Similarly, the waveform 145e lags the waveform 145d by the angle $\alpha_1$ while the waveform 145f lags the waveform 145e by the phase displacement $\alpha_2$. In the preferred embodiment, the angle $\alpha_1$ is constant during operation and the angle $\alpha_2$ is varied by the local control unit 144 to accomplish voltage regulation. This is effected by the synchronization circuit 150 which causes the LCU 144 to vary the angle $\alpha_2$ in accordance with the phase command signal.

It should be noted that the angle $\alpha_1$ may instead be variable and the angle $\alpha_2$ fixed to thereby accomplish the same result, if desired.

Figure 6:
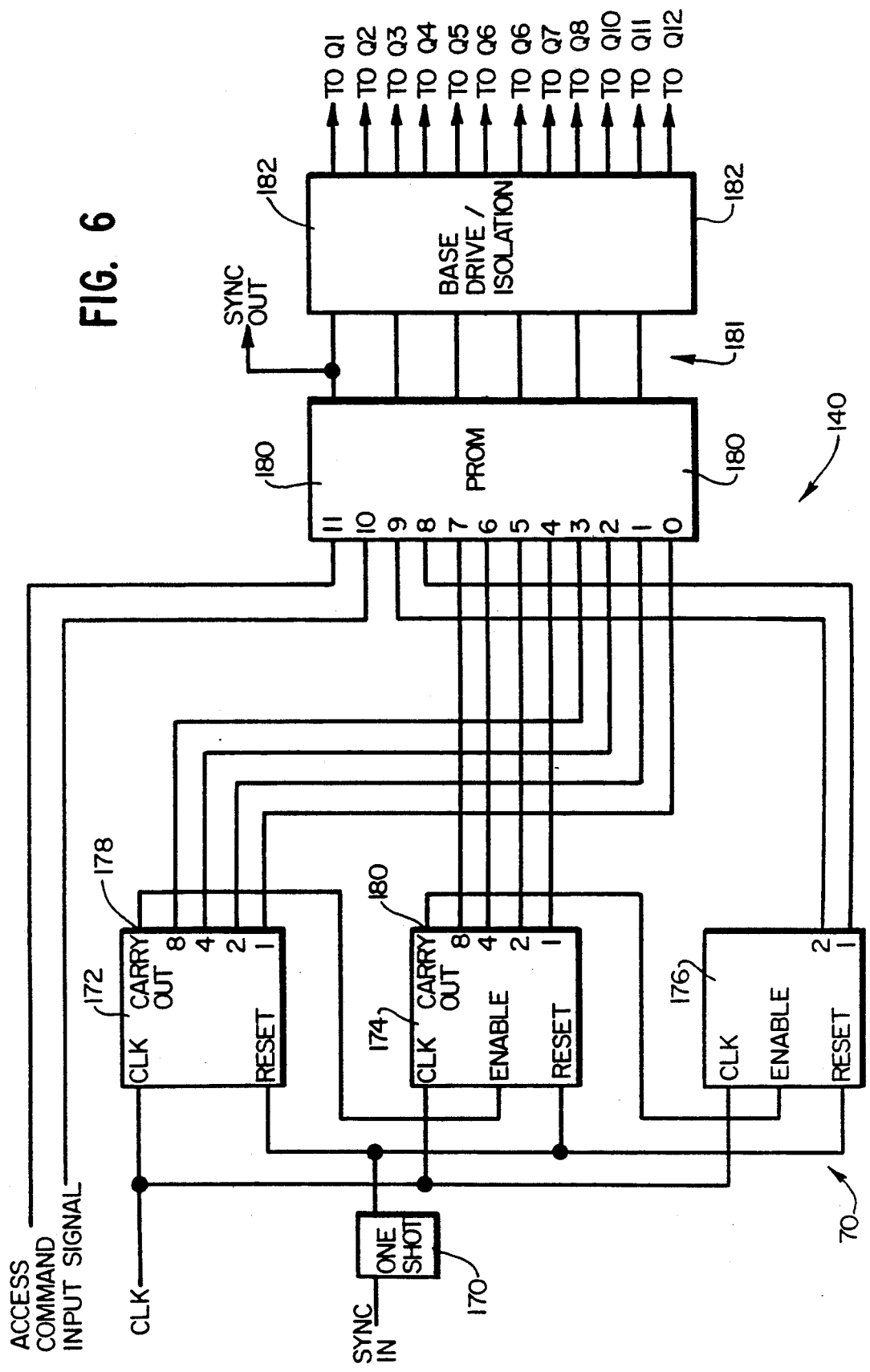
FIG. 6 is comprises a block diagram illustrating the design of the local control units of FIG. 5.

FIG. 6 illustrates the LCU 140 in greater detail, it being understood that the LCU's 142 and 144 are identical thereto. The LCU 140 includes a gating circuit in the form of a one-shot 170 which receives the synchronization signal developed by the circuit 148. In the case of the LCU 144, the synchronization signal is provided by the circuit 150. The one-shot is coupled to reset inputs of first through third four-bit counters 172, 174 and 176, respectively. The counters 172-176 further include clock inputs which receive clock pulses produced by the clock 146. A ripple carry output 178 of the counter 172 is coupled to an enable input of a counter 174 while a ripple carry output 180 of the counter 174 is coupled to an enable input of the counter 176. A four-bit output of the counter 172 is coupled to memory address inputs 0-3 of a memory 180 which may comprise, for example, an EPROM. Memory address inputs 4-7 of the memory 180 receive a four-bit output from the counter 174 whereas memory address inputs 8 and 9 receive the two lowest order output bits from the counter 176. A further pair of memory address inputs 10 and 11 receive an access command input signal which may be provided by a master control unit or which may be provided by a signal generator which is separate from or a part of the LCU 140.

The memory 180 stores data for operating the subinverters 70, 72 so that they produce the first and second waveforms, respectively. In the preferred embodiment, the memory 180 includes four kilobytes of storage wherein the data stored in three of the kilobytes are used to control the subinverters 70-80. Each byte consists of eight bits of data. A one kilobyte block of memory contains the data required for controlling the subinverters 70, 72 whereas different one kilobyte blocks of memory contain the data required to control the subinverters 74, 76 and 78, 80. The access command input signal selects the appropriate block of memory and the counters 172, 174, 176 sequentially access the storage locations of the selected block so that a sequence of eight-bit words are provided at an output 181 of the memory 180. Six of the eight bits are used to generate the waveforms produced by the subinverters 70, 72. Each bit controls one leg of an inverter. For example, the data provided at bit position 1 of the bytes control the switches Q1 and Q2, the data provided at bit position 2 controls the switches Q3 and Q4 and the data provided at bit position 3 control the switches Q5 and Q6. Similarly, the data appearing at bit positions 4, 5 and 6 control the switches Q7, Q8 and Q9, Q10 and Q11, Q12, respectively. The frequency of the clock 146 is selected to be $2^{10}/2.5 \times 10^{-3} = 409.6$ kHz to produce output waveforms from the subinverters 70-80 at a desired frequency of 400 Hz.

The bits retrieved from the memory 180 are delivered to a base drive/isolation circuit 182 which may be of conventional design. The circuit 182 develops complimentary base drive signals for the switches of each subinverter leg from the data provided by the memory 182. For example, a high state bit in bit position 1 is utilized to develop a high state base drive signal for the transistor Q1 and a low state base drive signal for the transistor Q2. A low state bit in this bit position results in a low state base drive signal for the transistor Q1 and a high state base drive signal for the transistor Q2. The base drive signals are isolated and amplified as needed and protection against simultaneous conduction of both transistors in each leg is provided by the circuit 182. The synchronization output signal for the synchronization circuit 150 is obtained from the base drive signal for the transistor Q1.

Figure 7:
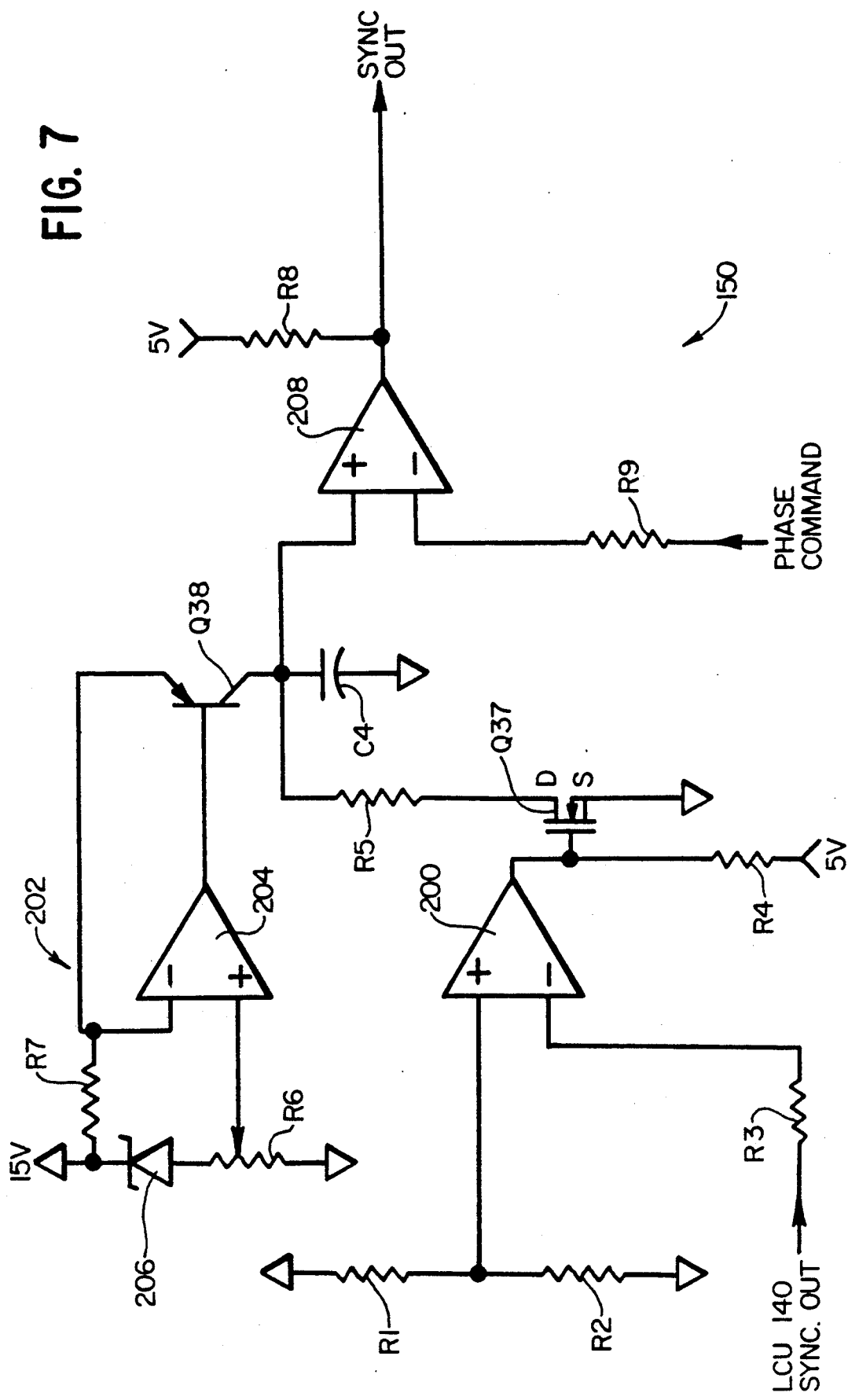
FIG. 7 comprises a schematic diagram of the synchronization circuit 150 of FIG. 5.

FIG. 7 illustrates the synchronization output circuit 150 in greater detail. The circuit includes a first comparator 200 having inverting and non-inverting inputs which receive the synchronization signal developed by the LCU 140 and a reference signal produced by a voltage divider comprising resistors R1 and R2, respectively. The comparator 200 includes an output which is coupled to a gate electrode of a transistor Q37 and is further coupled to a positive voltage, such as 5 volts, through a resistor R4. A drain electrode of the transistor Q37 is coupled by a resistor R5 to a capacitor C4. A source electrode of the transistor Q37 is connected to ground potential.

A constant current source 202 is coupled to the junction between the capacitor C4 and the resistor R5. In the preferred embodiment, the constant current source comprises an operational amplifier 204 having a non-inverting input coupled to a junction between a series-connected combination of a zener diode 206 and a resistor R6. The series-connected combination is coupled to a voltage of, for example, 15 volts. A second, inverting input of the operational amplifier 204 is coupled to a first main current path or emitter electrode of a transistor Q38 and to 15 volts by a resistor R7. A control or base electrode of the transistor Q38 is coupled to an output of the operational amplifier 204 and a second main current path or collector electrode of the transistor Q38 is coupled to the capacitor C4.

A comparator 208 includes a non-inverting input coupled to the capacitor C4 and an inverting input which receives the phase command signal developed by the function generator 160. An output of the comparator 208 is coupled through a resistor R8 to a voltage of, for example, 5 volts and is further coupled to the synchronization input of the LCU 144, FIG. 4.

Figure 8:
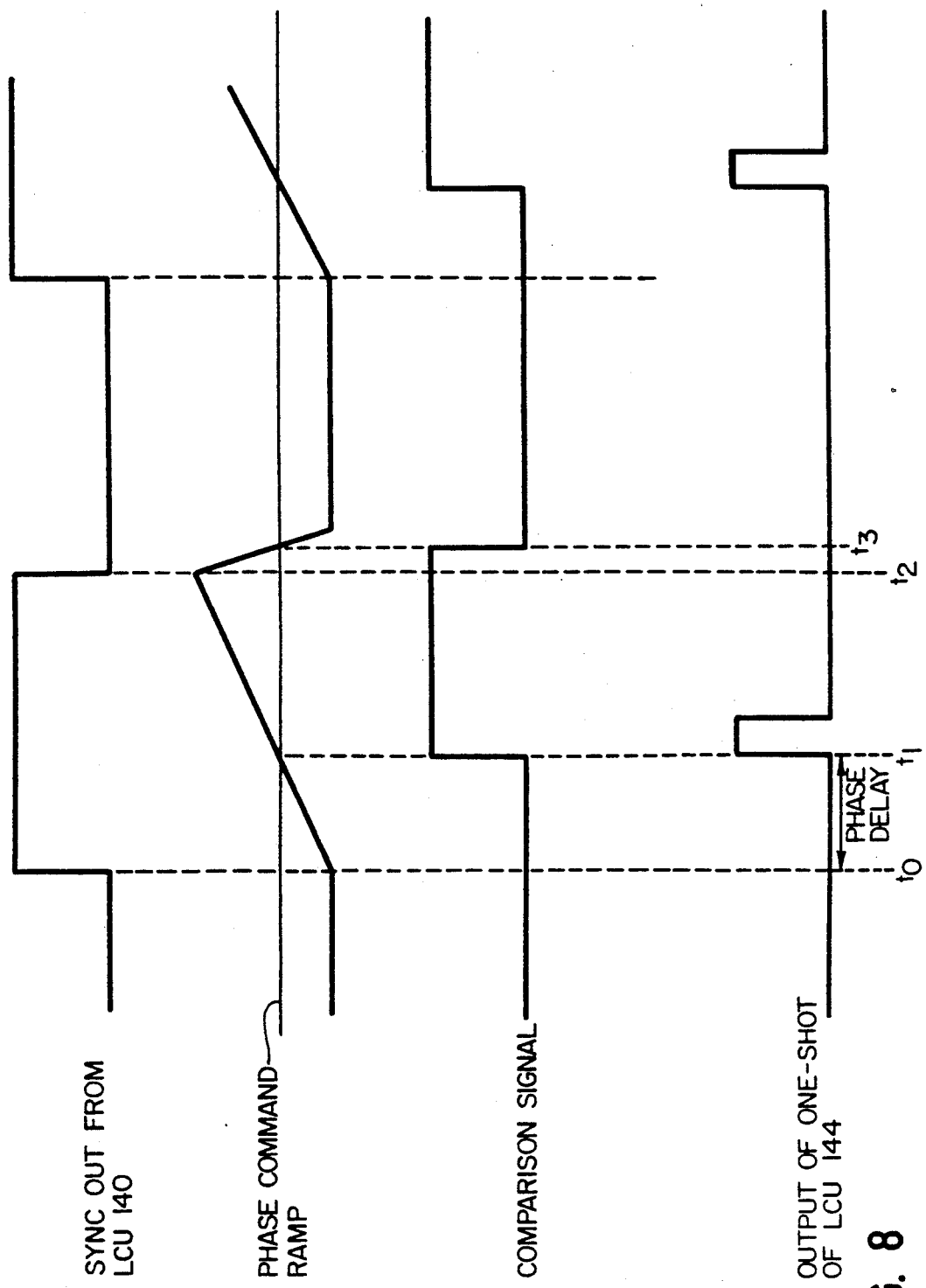
FIG. 8 comprises a series of waveform diagrams illustrating the operation of the synchronization circuit 150 of FIG. 7.

Referring also to FIG. 8, the synchronization output signal from the LCU 140 comprises a rectangular waveform which, for example, switches between low and high states at a time $t_0$. At this time, the output of the comparator 200 switches to a low state, in turn causing the transistor Q37 to turn off. The constant current source 202 charges the capacitor C4 to cause generation of a linearly increasing ramp voltage at the non-inverting input of the comparator 208. The comparator 208 produces a low state synchronization or comparison signal until a time $t_1$, at which point the ramp voltage rises above the phase command signal. At the time $t_1$, the comparison signal from the comparator 208 switches to a high state.

At a time $t_2$, the synchronization output signal provided by the LCU 140 drops to a low state, in turn causing the output of the comparator 200 to switch to a high state. This high state signal causes the transistor Q37 to turn on, which discharges the capacitor C4 through the resistor R5 to ground potential. The voltage at the non-inverting input of the comparator 208 thereby falls and reaches the level of the phase command signal at a time $t_3$. At this point in time, the comparison signal developed at the output of the comparator 208 reverts to a low state.

Following the time $t_3$, the sequence described above repeats.

As seen in the lowest two waveforms of FIG. 7, the rising edge of the synchronization signal from the LCU 140 occurs at the time $t_0$ whereas the one-shot in the LCU 144 produces a counter reset pulse at the time $t_1$. The separation between these times determines the angle $\alpha_2$ and is controlled by the level of the phase command signal produced by the function generator 160.

The memories 180 of the LCU's 140, 142 and 144 are loaded with identical information so that the subinverters 70, 74 and 78 produce substantially identical waveforms, as do the subinverters 72, 76 and 80. However, the data are physically shifted in the memory locations of successive memories so that the waveforms produced by the subinverters 74 and 76 are shifted by a predetermined amount, such as 10°, relative to the waveforms produced by the subinverters 70 and 72 and so that the waveforms produced by the subinverters 78 and 80 are shifted by the same amount relative to the waveforms produced by the subinverters 74 and 76 when the counter reset pulses for the LCU's 140, 142 and 144 are simultaneously developed. As the phase command signal from the function generator 160 increases to provide a delay between the times $t_0$ and $t_1$, the angle $\alpha_2$ increases, in turn causing the counters 172, 174 and 176 of the LCU 144 to be reset at later times relative to the counters of the LCU's 140 and 142. Changing the angle $\alpha_2$ in turn results in a change in the magnitude of the output voltages from the summing transformer 114. However, changing this angle also changes the harmonic content in the output. The degree of regulation which can be accomplished by the present invention may thus be limited by the degree of harmonic content permitted in the output of the inverter 24.

In the event the angle $\alpha_1$ is to be varied, the synchronization input of the LCU 142 receives the output of the circuit 150 and the synchronization input of the LCU 144 receives the output of the circuit 148. Also, the memories of the LCU's 140, 144 are loaded with data which result in a constant angle $\alpha_3$ between the waveforms produced by the subinverters 70, 72 and 78, 80. The angle $\alpha_1$ would thus be variable to permit output voltage regulation.

The regulator of the present invention accomplishes output voltage regulation of a stepped-waveform inverter in a simple fashion with a high degree of accuracy.

We claim:

1. A regulator for a stepped-waveform inverter having first and second subinverters, a summing transformer having first and second primary windings coupled to the first and second subinverters, respectively, and a secondary winding in which summed AC output power is produced, the subinverters developing first and second waveforms in the first and second primary windings wherein the second waveform is phase displaced by an angle $\alpha$ relative to the first waveform, comprising:

means for detecting a deviation of a parameter of the AC output power from a reference;
    means coupled to the detecting means for deriving a phase command signal from the detected deviation;
    a comparator for comparing the phase command signal with a ramp signal to obtain a comparison signal; and
    first and second means coupled to the first and second subinverters, respectively, and responsive to the comparison signal for operating same to cause the angle $\alpha$ to vary in accordance with the phase command signal, wherein each of the first and second operating means includes a memory which stores data for developing the first and second waveforms, respectively, and a one-shot wherein the one-shot of the first operating means receives a synchronization signal and wherein the one-shot of the second operating means receives the comparison signal.

2. The regulator of claim 1, wherein each of the first and second operating means includes a counter coupled between the one-shot and the memory thereof, both counters accumulating pulses of a clock signal and being periodically reset by the one-shot coupled thereto.

3. A regulator for stepped-waveform inverter having first and second subinverters, a summing transformer having first and second primary windings coupled to the first and second subinverters, respectively, and a secondary winding in which summed AC power is produced, the subinverters developing first and second waveforms in the first and second primary windings wherein the second waveform is phase displaced by an angle α relative to the first waveform, comprising:
  means for detecting a deviation of a parameter of the AC output power from a reference;
  means coupled to the detecting means for deriving a phase command signal from the detected deviation;
  a comparator for comparing the phase command signal with a ramp signal to obtain a comparison signal; and
  first and second means coupled to the first and second subinverters, respectively, and responsive to the comparison signal for operating same to cause the angle α to vary in accordance with the phase command signal;
  wherein the ramp signal is produced by an integrator which integrates a synchronization signal, the integrator including an operational amplifier having a pair of inputs and an output wherein one of the inputs receives the synchronization signal and the other input receives a reference signal and a capacitor coupled to the output of the operational amplifier wherein a transistor and a resistor are coupled between the output of the operational amplifier and the capacitor.

4. A regulator for stepped-waveform inverter having first and second subinverters, a summing transformer having first and second primary windings coupled to the first and second subinverters, respectively, and a secondary winding in which summed AC power is produced, the subinverters developing first and second waveforms in the first and second primary windings wherein the second waveform is phase displaced by an angle α relative to the first waveform, comprising:
  means for detecting a deviation of a parameter of the AC output power from a reference;
  means coupled to the detecting means for deriving a phase command signal from the detected deviation;
  a comparator for comparing the phase command signal with a ramp signal to obtain a comparison signal; and
  first and second means coupled to the first and second subinverters, respectively, and responsive to the comparison signal for operating same to cause the angle α to vary in accordance with the phase command signal;
  wherein the ramp signal is produced by an integrator which integrates a synchronization signal, the integrator including an operational amplifier having a pair of inputs and an output wherein one of the inputs receives the synchronization signal and the other input receives a reference signal and a capacitor coupled to the output of the operational amplifier wherein a current source is coupled to the capacitor.

5. The regulator of claim 4, wherein the current source comprises a second operational amplifier having a pair of inputs and an output, a zener diode coupled to a resistor and one input of the second operational amplifier at a junction wherein the zener diode and the resistor form a series combination coupled to a voltage and a transistor having a control electrode coupled to the output of the second operational amplifier, a first main current path electrode coupled to the other input of the second operational amplifier and a second main current path electrode coupled to the capacitor.

6. A regulator for a stepped-waveform inverter having first through sixth three-phase subinverters which produce first through sixth waveforms, respectively, a summing transformer having first through sixth sets of primary windings coupled to the first through sixth subinverters, respectively, wherein each of the first, third and fifth sets of primary windings is connected in a wye configuration and each of the second, fourth and sixth sets of primary windings is connected in a delta configuration, the summing transformer further including a set of three-phase secondary windings in which three-phase voltages are produced, wherein the third and fourth waveforms are displaced a fixed angle $α_1$ relative to the first and second waveforms, respectively, and the fifth and sixth waveforms are displaced a variable angle $α_2$ relative to the third and fourth waveforms, respectively, comprising:
  an averaging circuit for developing an average signal representing an average level of the three-phase voltages;
  means coupled to the averaging circuit for deriving a phase command signal from the average signal;
  means for developing a synchronization signal from the phase command signal; and
  means for operating the fifth and sixth subinverters in accordance with the synchronization signal to cause the angle $α_2$ to vary in a manner which causes the average level of the three-phase voltages to approach a certain level.

7. The regulator of claim 6, wherein the developing means includes a comparator which compares the phase command signal with a ramp signal to obtain a comparison signal.

8. The regulator of claim 7, wherein the operating means includes a one-shot coupled to the comparator.

9. The regulator of claim 7, wherein the ramp signal is produced by an integrator which integrates a further synchronization signal.

10. The regulator of claim 9, wherein the integrator comprises an operational amplifier having a pair of inputs and an output wherein one of the inputs receives the synchronization signal and the other input receives a reference signal and a capacitor coupled to the output of the operational amplifier.

11. The regulator of claim 10, wherein a transistor and a resistor are coupled between the output of the operational amplifier and the capacitor.

12. The regulator of claim 11, wherein a current source is coupled to the capacitor.

13. The regulator of claim 12, wherein the current source comprises a second operational amplifier having a pair of inputs and an output, a zener diode coupled to a resistor and one input of the second operational amplifier at a junction wherein the zener diode and the resistor form a series combination coupled to a voltage and a transistor having a control electrode coupled to the output of the second operational amplifier, a first main current path electrode coupled to the other input of the second operational amplifier and a second main current path electrode coupled to the capacitor.

14. The regulator of claim 6, wherein the deriving means includes a summer which sums the average signal with a reference to obtain a deviation signal and a function generator responsive to the deviation signal which produces the phase command signal.

15. The regulator of claim 6, wherein the operating means includes a memory which stores data for developing the fifth and sixth waveforms.

16. The regulator of claim 15, wherein the operating means further includes a counter coupled to the memory and which accesses same in accordance with an accumulated count of clock pulses.

* * * * *